(12) United States Patent
Swain et al.

(10) Patent No.: US 12,233,780 B2
(45) Date of Patent: Feb. 25, 2025

(54) HEAT INDEX SENSING SYSTEM (71) Applicant: American Aluminum Associates, Inc., Perry, FL (US)

(72) Inventors: Marisol Swain, Perry, FL (US); Jennifer Nicole Arnold, Perry, FL (US); Alice E. Poseley, Elkhart, IN (US)

(73) Assignee: AMERICAN ALUMINUM ACCESSORIES, LLC, Stevens Point, WI (US)

( * ) Notice: Subject to any disclaimer, the term of this patent is extended or adjusted under 35 U.S.C. 154(b) by 0 days.

(21) Appl. No.: 17/477,439

(22) Filed: Sep. 16, 2021

(65) Prior Publication Data

US 2022/0001799 A1 Jan. 6, 2022

Related U.S. Application Data

(63) Continuation of application No. 16/201,418, filed on Nov. 27, 2018, now Pat. No. 11,135,972.

(60) Provisional application No. 62/619,083, filed on Jan. 18, 2018.

(51) Int. Cl.
| | |
|---|---|
| *B60Q 9/00* | (2006.01) |
| *E05F 15/71* | (2015.01) |
| *G06F 3/04847* | (2022.01) |
| *G06F 3/0488* | (2022.01) |
| *G08B 21/18* | (2006.01) |
| *B60R 16/033* | (2006.01) |
| *G06F 3/0482* | (2013.01) |

(52) U.S. Cl.
CPC ............... *B60Q 9/00* (2013.01); *E05F 15/71* (2015.01); *G06F 3/04847* (2013.01); *G06F 3/0488* (2013.01); *G08B 21/182* (2013.01); *B60R 16/033* (2013.01); *E05Y 2900/55* (2013.01); *G06F 3/0482* (2013.01)

(58) Field of Classification Search
CPC ........ B60Q 9/00; E05F 15/71; G06F 3/04847; G06F 3/0488; G06F 3/0482; G06F 3/04886; G08B 21/182; B60R 16/033; E05Y 2900/55
See application file for complete search history.

(56) References Cited

U.S. PATENT DOCUMENTS

| | | |
|---|---|---|
| 5,259,814 A | 11/1993 | Weissbrich et al. |
| 5,793,284 A | 8/1998 | Teague |
| 5,793,291 A | 8/1998 | Thornton |
| 6,252,406 B1 | 6/2001 | Tegge et al. |
| 6,496,106 B1 | 12/2002 | Rodriguez |
| 7,081,811 B2 | 7/2006 | Johnston et al. |
| 8,830,068 B2 | 9/2014 | Campbell et al. |

(Continued)

OTHER PUBLICATIONS

Tech Thursday: Denver startup creates device to help monitor your dog when left in the car; https://www.thedenverchannel.com/news/local-news/denver-startup-creates-device-to-help-monitor-your-dog-when-left-in-the-car; Apr. 27, 2017; 16 pages.

*Primary Examiner* — Michael V Kerrigan
(74) *Attorney, Agent, or Firm* — Faegre Drinker Biddle & Reath LLP (57) ABSTRACT

The subject invention relates to temperature and Heat Index sensing system, and in particular to a system suited for use in a K9 Police Vehicle that both monitors the temperature and heat index and provides an alert if pre-set maximum values are exceeded.

12 Claims, 8 Drawing Sheets

(56) References Cited

U.S. PATENT DOCUMENTS

| | | |
|---|---|---|
| 10,814,744 B2 * | 10/2020 | Labombarda .......... G01P 15/18 |
| 11,135,972 B2 | 10/2021 | Swain et al. |
| 2002/0109583 A1 | 8/2002 | Losey |
| 2002/0161501 A1 | 10/2002 | Dulin et al. |
| 2003/0098784 A1 | 5/2003 | Van Bosch et al. |
| 2003/0222775 A1 | 12/2003 | Rackham et al. |
| 2013/0041549 A1 | 2/2013 | Reeve et al. |
| 2013/0144470 A1 | 6/2013 | Ricci |
| 2017/0223922 A1 | 8/2017 | Loopesko |

* cited by examiner

HEAT INDEX SENSING SYSTEM

CROSS-REFERENCE TO RELATED APPLICATION

The present application is a continuation application of U.S. patent application Ser. No. 16/201,418, filed Nov. 27, 2018, issuing as U.S. Pat. No. 11,135,972 which claims priority to U.S. Provisional Patent Application Ser. No. 62/619,083, filed Jan. 18, 2018, the complete disclosures of which are expressly incorporated herein by reference.

BACKGROUND OF THE INVENTION

The subject invention relates to temperature and Heat Index sensing system, and in particular to a system suited for use in a K9 Police Vehicle that both monitors the temperature and heat index and provides an alert if pre-set maximum values are exceeded.

K-9 units have become commonplace in many communities and police. Custom units are often used to transport the dogs along with their handlers. If the handler gets out of the vehicle and leaves the dog in, the vehicle is locked and ventilation is limited as it is desirable to prevent the public from coming in contact with the dog.

Heretofore, it has been known to provide temperature sensing and alarms in a K-9 unit to alert the handlers if the temperature exceeds a desirable level. Such a system is shown in U.S. Pat. No. 7,081,811 to Johnston et al., which is hereby incorporated in its entirety herein by reference. A shortcoming of the system in Johnston et al. is that it only monitors temperature. A truer indication of the condition inside the vehicle would be provided by a system that monitors heat index. It is an object of the subject invention to provide a system and alarm for monitoring the heat index environment in a vehicle or other confining space.

SUMMARY OF THE INVENTION

A receiver is installed inside a K9 vehicle or Cool Guard™ enclosure, including a separate Printed Circuit Board (PCB). A control unit/head is a stand-alone unit with a touch screen illuminated display, which in one embodiment is a minimum 2.8"×2.1". Customer interface to the control head is with a touch screen (similar to a smart phone) that is software controlled and can accept a touch switch press to select functions. There are both visual and audio feed back for the operation of the touch screen. The control unit includes extra inputs and outputs for future growth of the system.

The temperature probe housing is one of a temperature/humidity probe configuration, which are currently available. The probes are 100% tested and fully calibrated to meet the data sheet specifications. This improves the quality of the complete system. The probes send a digital signal to the controller that can be interpreted and translated into temperature readings and humidity readings. In one embodiment, the temperature probes are fully over-molded and sealed with a tab for installing near the K9 cage.

There The system includes a power distribution module (PDM) that handles the high current from the battery and distributes it to both the Cool Guard Pro™ (CGP) and RESCUE™ modules (RSQ). All outputs that are not electrically protected using a smart switch, are protected on the PDM with fuses. An object of the invention is to make the installation as easy as possible for the installers.

The Cool Guard Pro™ also evaluates the various technologies such as Bluetooth, cell phone dialers, cameras in the cage.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 1:
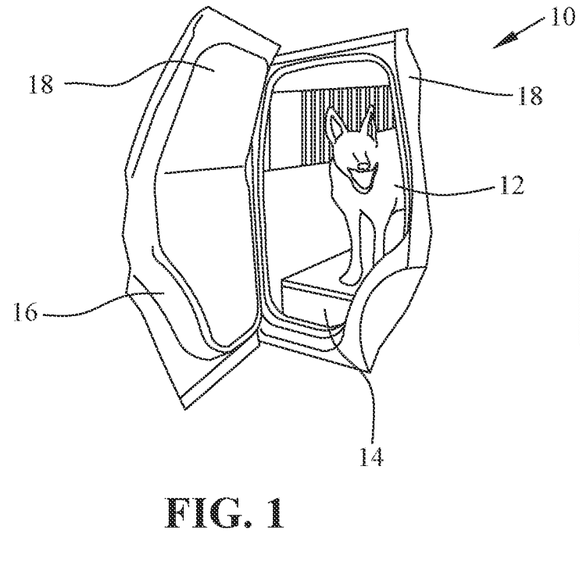
FIG. 1 is a perspective view of a K-9 vehicle having a heat index sensing and alarm system in accordance with the subject application.

Referring now to FIG. 1, a vehicle is shown generally indicted as 10. In one embodiment, vehicle 10 is specifically configured to transport and contain a dog 12. Vehicle 10 includes an opening 14, door 16, and windows 18. Vehicle 10 is also equipped with a heat index sensing and alarm system (not shown in FIG. 1), for notifying handlers of the dog if a pre-set heat index value has been exceeded.

Now referring to FIGS. 2-6, various views of one embodiment of a control unit 20 for the heat index sensing and alarm system are shown. Control unit 20 has a housing 22 and a display screen 24, which is preferably a touch sensitive screen. Display screen 24 can depict and allow setting of a variety of parameters 26 and in one embodiment has a known 4.3" screen. One suitable touch screen is available by New Haven brand. The unit includes a custom printed circuit board design as discussed in further detail below and depicted in the figures and the control unit handles the software for the screen shots. Housing 22 is preferably made in two or more parts to allow access to the interior. Accordingly, in the embodiment shown housing 22 includes a seem 28 and is held together by threaded fasteners received in apertures containing female threads to receive fasteners 30 in a rear face 31 of housing 22. A power connection 32 is also located in rear face 31, which can be a standard connection known in the art. Control unit 20 also includes a sensor 34, which can be a light and/or motion detector sensor to activate/dim/or brighten display screen 24 as discussed below, and a speaker 36 located inside the housing in communication with outside the housing through holes in rear face 31. Speaker 36 is connected to touch display screen PCB using wires soldered to solder pads.

Figure 2:
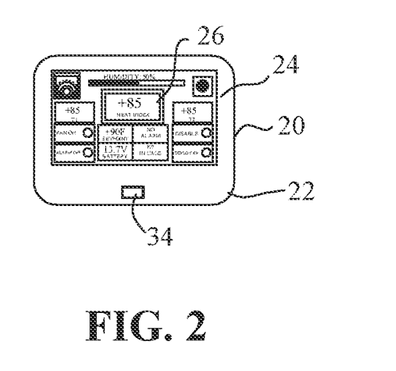
FIG. 2 is a front view of a control unit for a heat index sensing and alarm system in accordance with one embodiment of the invention.
Figure 3:
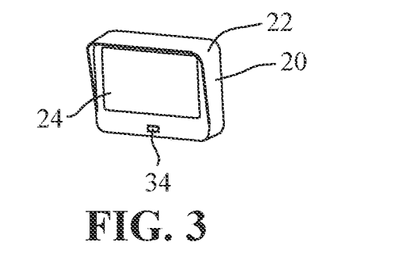
FIG. 3 is a front perspective view of the control unit for a heat index sensing and alarm system shown in FIG. 2.
Figure 4:
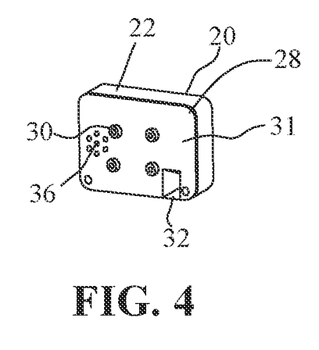
FIG. 4 is a rear perspective view of the control unit for a heat index sensing and alarm system shown in FIG. 2.
Figure 5:
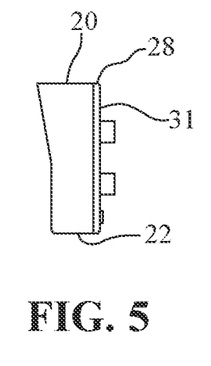
FIG. 5 is a side view of the control unit for a heat index sensing and alarm system shown in FIG. 2.
Figure 6:
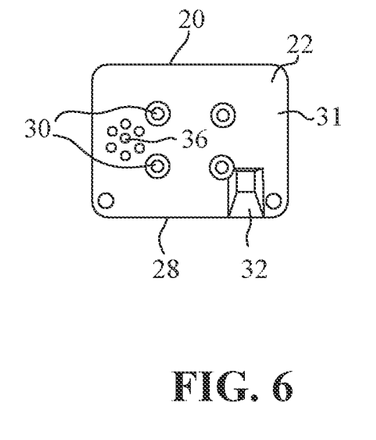
FIG. 6 is a rear view of the control unit for a heat index sensing and alarm system shown in FIG. 2.

The auto light dim feature 34 on the touch screen module 20, requires a lens that is accessible in the enclosure. With this feature, the officer does not need to dim or brighten the touch screen as daylight turns to night. This is important because it prolongs the pixel life in the touch screen. In addition, to conserve power, this sensor can detect the proximity of a hand within 3-12 inches and then auto-brighten the screen when the hand is detected. One suitable unit is the Si1153-AA00-GMR (ICS12858-1) plus an external IR LED. The version with its own internal LED does proximity detection, but it cannot do ambient light sensing because it has a built-in IR filter on the light detector.

Figure 7:
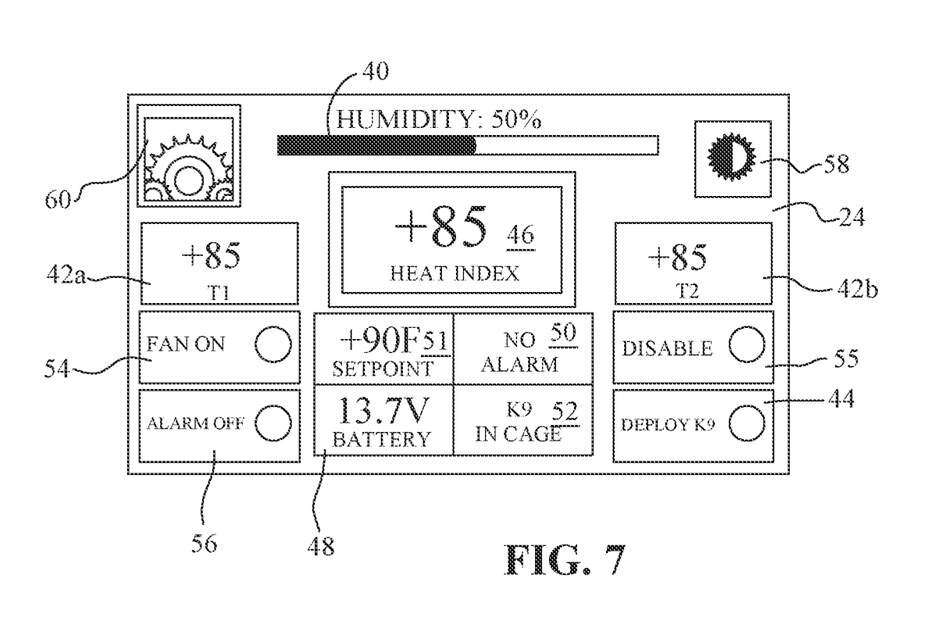
FIG. 7 is an enlarged front view of one embodiment of a display on the control unit for a heat index sensing and alarm system shown in FIG. 2.

Now referring to FIG. 7, one embodiment of a display screen 24 is shown. Display screen 24 includes areas to show the humidity 40, temperature readings 42a,b, K9 deploy 44, the heat index 46 (which is calculated from combined temperature readings of 42a,b), battery voltage 48, alarm status 50, set point 51, K9 in cage status 52, a fan switch 54, a disable input 55, an alarm off input 56, a dim lights input 58, and a change screen control 60. The touch screen is connected to the controller via a four-wire telephone cable having gold connectors on each end as it serves as a data cable. The brightness on the touchscreen 24 is bright enough to be visible in sunlight.

Figure 8:
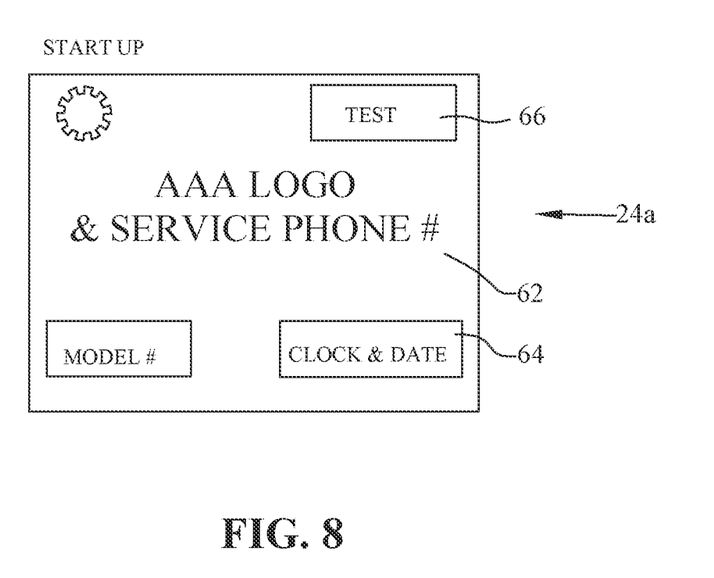
FIG. 8 is a front view of the display on the control unit during start up for a heat index sensing and alarm system shown in FIG. 2.

Now referring to FIG. 8, an embodiment of the display screen during Start Up is shown generally indicated as 24a. Display screen 24 can include such information as a service phone number 62, clock with date and time reading 64, and a system test control 66, which can be performed at the same time as entering vehicle 10 while the temperature is acclimating. The clock is a real-time clock with a battery backup. The battery is removable should it need to be replaced. One suitable battery is a coin style, 3V, CR2032 battery.

Figure 9:
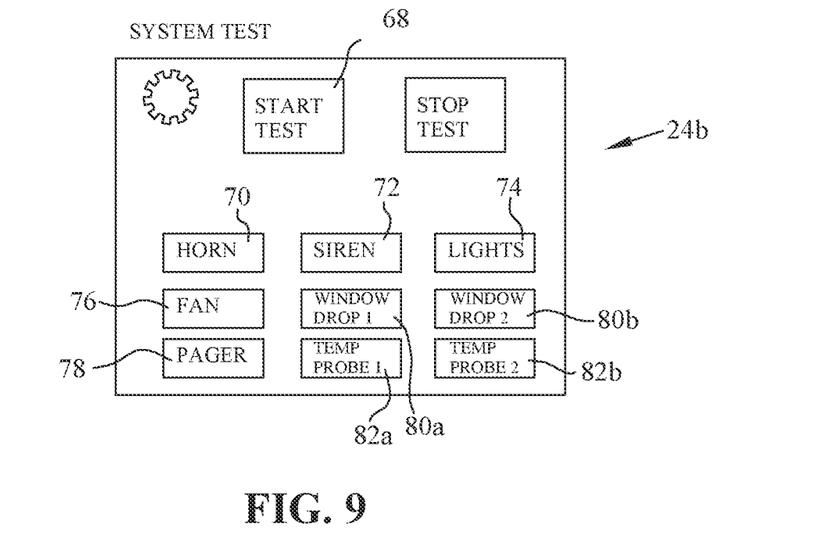
FIG. 9 is a front view of the display on the control unit during system test for a heat index sensing and alarm system shown in FIG. 2.

Now referring to FIG. 9, an embodiment of a system test control display screen is generally depicted as 24b. Display screen 24b, includes an automatic walk-about test control 68, and individual function tests for such items including, but not limited to the horn 70, the siren 72, the lights 74, the fan 76, a pager 78, first and second window drops 80a,b, respectively and first and second temperature probes 82a,b, respectively. The horn output is minimum 500 mA ground and in one embodiment is connected to the vehicle 10 horn relay and wired in parallel with a chime, which is part of the system. The chime can be used instead of the horn, which reduces the install time. The horn/chime output is used in both the RESCUE and Cool Guard Pro applications There are two light outputs, which are smart switches. The CGP is connectable to two types of lighting, which flash when the alarm is triggered. A relay is required to handle 10 A each, the output of the higher current requirements, which is located in a power distribution module as discussed below.

Figure 10:
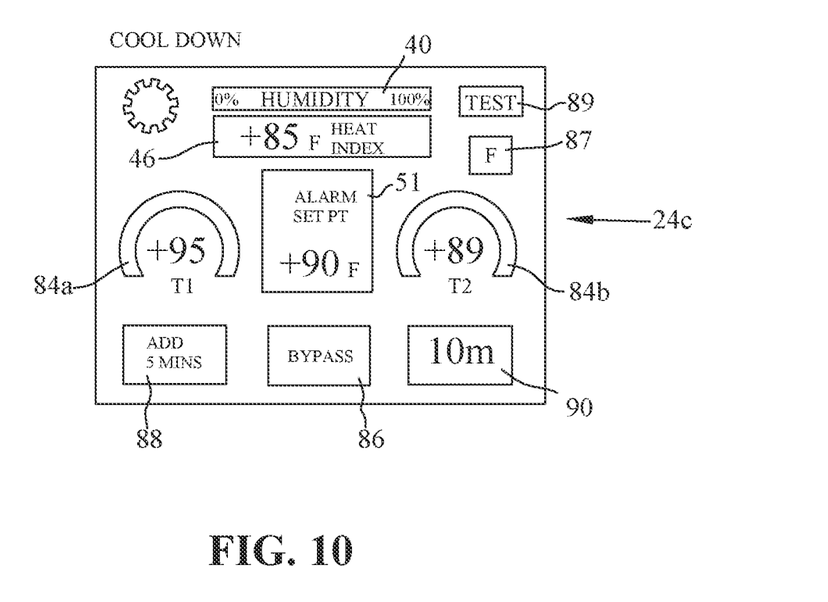
FIG. 10 is a front view of the display on the control unit during cool down for a heat index sensing and alarm system shown in FIG. 2.

Now referring to FIG. 10, an embodiment of a cool down display screen is shown generally indicated as 24c. Cool down display screen 24c includes first and second temperature monitors 84a,b, respectively. The system also includes a bypass cool down control 86, an add five minutes control 88, and a countdown clock 90.

Figure 11:
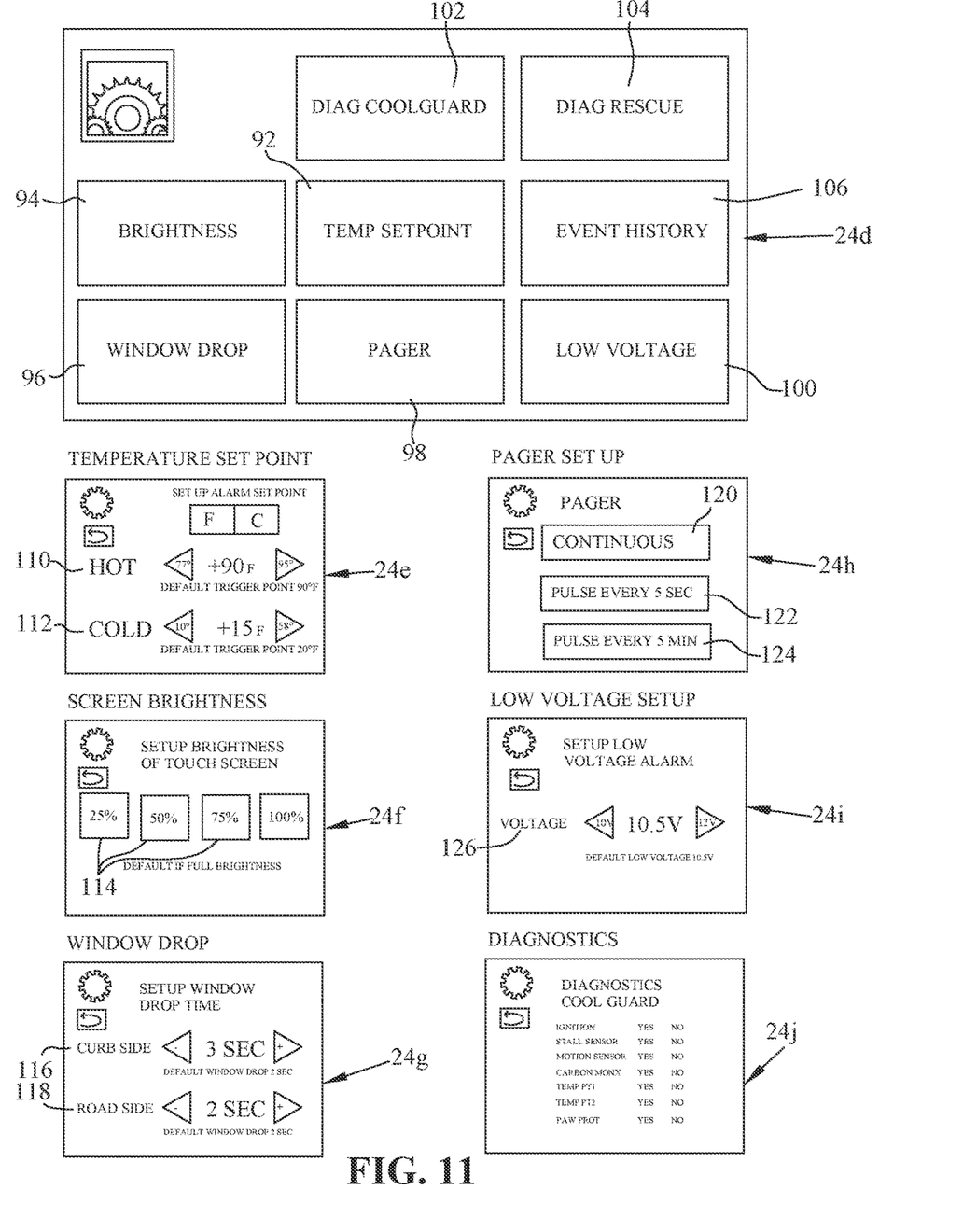
FIG. 11 is a front view of the display on the control unit during system set up including screen shots for temperature set, screen brightness, window drop, pager set up, low voltage set up, and diagnostics for a heat index sensing and alarm system shown in FIG. 2.

Now referring to FIG. 11, an embodiment of a system set-up display screen is shown generally indicated as 24d. System set-up display screen 24d includes temperature set points 92, screen brightness control 94, window drop control 96, pager set-up control 98, low voltage set-up 100, diagnostics for Cool Guard™ 102, diagnostics for rescue 104, and event history 106. FIG. 10 also includes display screen for controlling/reading the parameters identified above for display screen 24d. In particular, a temperature set point display screen 24e, a screen brightness setting display screen 24f, a window drop setting display screen 24g, a pager set up display screen 24h, a low voltage set up display screen 24i, and a diagnostics display screen 24j are shown. Display screen 24e includes temperature settings for both hot 110 and cold 112, wherein touching the respective arrow back or forward allow the hot and cold temperatures to be set at desired points. A default setting is included such as 90° F. for the hot temperature and 20° F. for the cold temperature. In the embodiment shown, screen 24f includes settings 114 for the brightness at 25%, 50%, 75%, and 100% of the full brightness. A default setting to full brightness is included. Display screen 24g includes settings for adjusting the time of window drops using plus or minus arrows for both the curb side window 116 and for the road side window 118. The default drop setting of two seconds for each window is included.

Pager set up display screen 24h includes touch settings for a continuous page 120, a pulse page every five seconds, and a pulse page every five minutes. Low voltage set up includes adjustment arrows to vary the value of the low voltage setting 126. A default setting, such as to 10.5V is included. Diagnostics display screen 24j for Cool Guard shows whether a number of parameters including but not limited to ignition, stall sensor, motion sensor, carbon monoxide sensor, temperature sensors, and paw protection are functioning properly.

Figure 12:
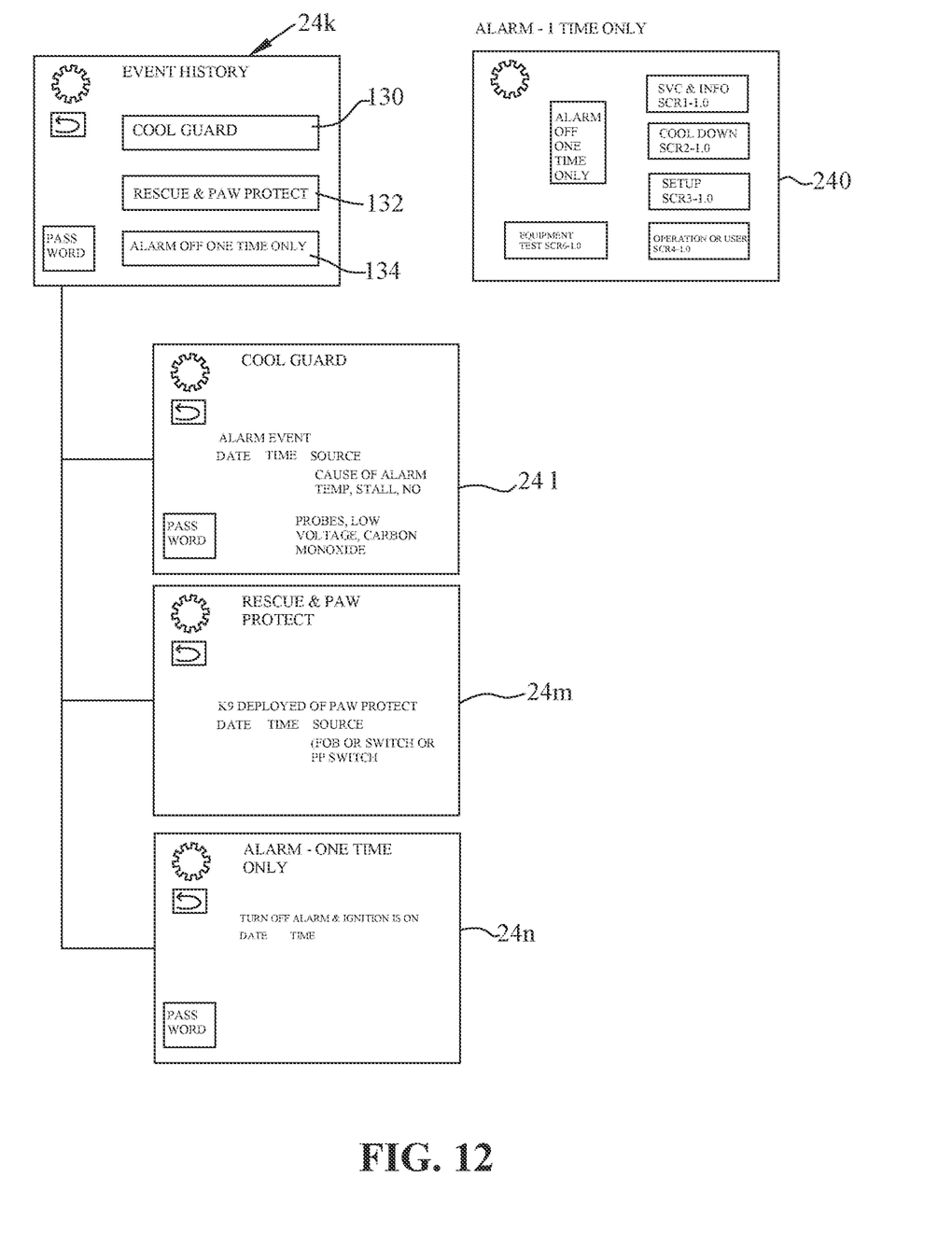
FIG. 12 is a schematic diagram showing various views of the display on the control unit for event history for a heat index sensing and alarm system shown in FIG. 2.

Now referring to FIG. 12, an event history display screen 24k is shown. Display screen 24k includes selection controls for Cool Guard 130, Rescue & Paw Protect 132, and Alarm Off—one time only 134. Display Screen 241 shows the screen when Cool Guard is selected on display screen 24k, and display screen 24m and 24n depict the screens when Rescue & Paw Protect and Alarm—One Tome Only are selected respectively. The screens provide information as to why an event occurred as well as the time and date of occurrence. Screen 24o is another display screen for the Alarm—One Time Only and is described more fully below.

Figure 13:
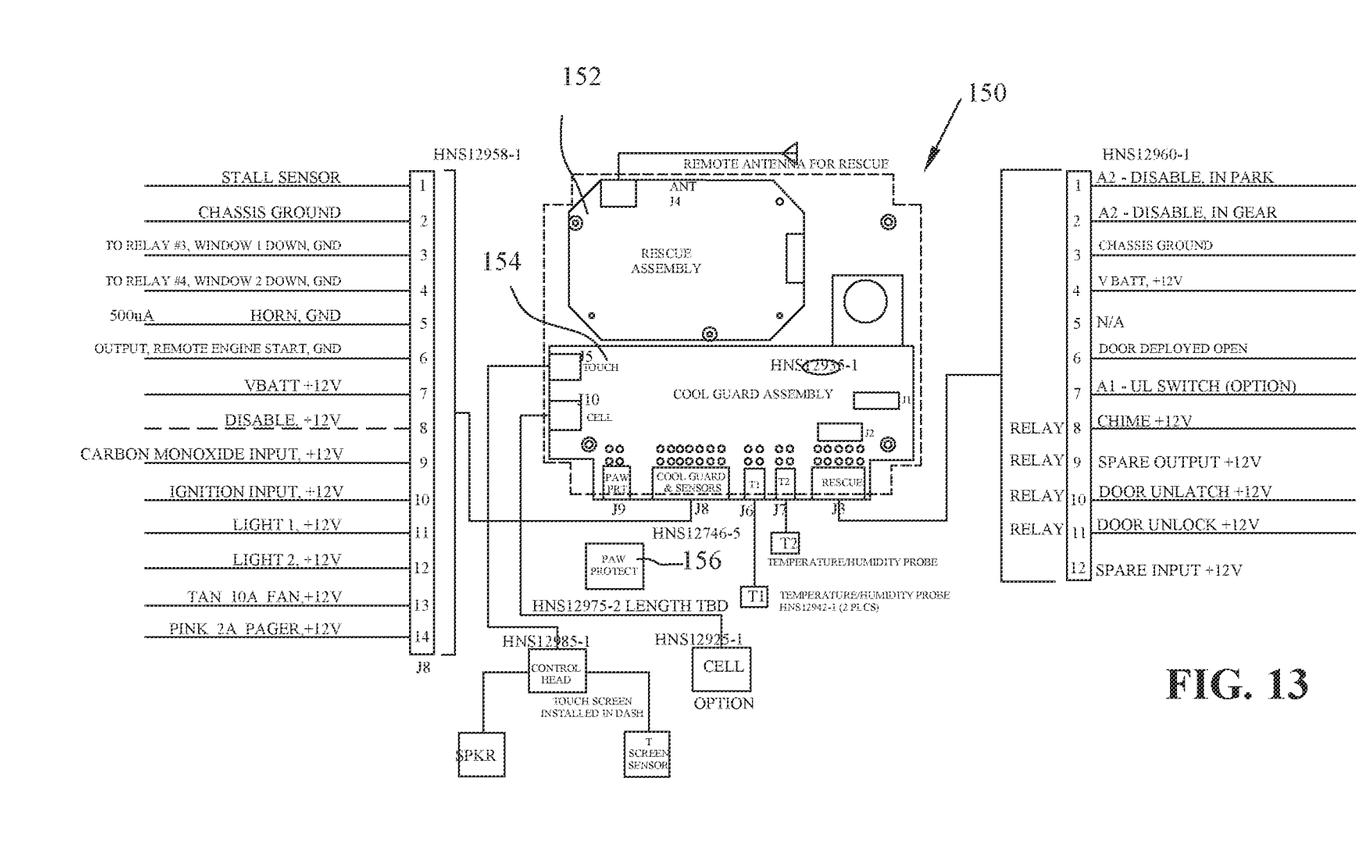
FIG. 13 is a schematic diagram showing a an embodiment of a printed circuit board for the control unit for a heat index sensing and alarm system shown in FIG. 2.
Figure 14:
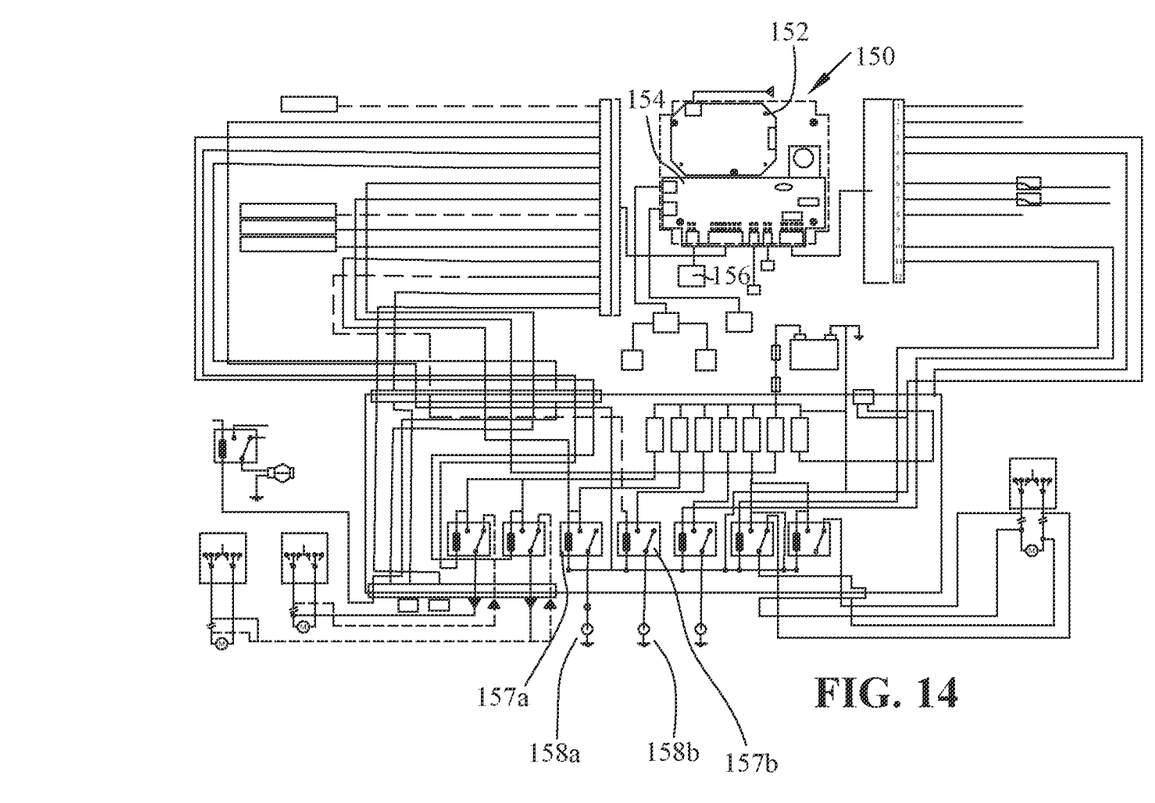
FIG. 14 is a schematic diagram showing a printed circuit board and outputs for the control unit for a heat index sensing and alarm system shown in FIG. 2.

FIGS. 13 and 14 are schematic diagrams of an embodiment of a printed circuit board (PCB) and outputs to controls for the functions operated by the unit, generally indicated as 150 for use with control unit 20. PCB 150 is designed to fit into the housing enclosure approximately, 6"×8". PCB 150 includes a Rescue assembly 152 and a Cool Guard assembly 154. The enclosure requires additional screw bosses in the enclosure top to mount both PCB's securely. There are one or more wire harness(es), which plug directly to both PCBs with indexed connectors. The wire harnesses exit at a right angle and all on the same side of the enclosure, which is one embodiment is at the bottom. There are no switches on the controller in this embodiment because all of the switches and customer interface is on the touch screen 24. There are several diagnostic LEDs on the circuit, which for instance can be a heartbeat LED in green and a status LED for circuit outputs such as yellow for a pager, light #1 & light #1, and a fan. Only the heartbeat LEDs for are visible (for example, by using a light pipe when the LEDs are located in the flat surface of the top enclosure). All outputs on the CGP unit are smart switches with diagnostic capabilities. All outputs on the RSQ are relays. A battery back up is provided to maintain the date and time on PCB 150. The CGP and RSQ PCB's are protected using a thick silicone conformal coating.

A power distribution module (PDM) is provided to handle the high current from battery and ground to the CGP & RSQ. It includes relays and fuses for the outputs from both the CGP and the RSQ. (See FIG. 13 for power circuits). The window drop circuits and lock/unlock switch are both reversal rest at ground (RR@G)) circuits and are in the PDM. The PDM is protected by a silicone conformal coating.

Figure 15:
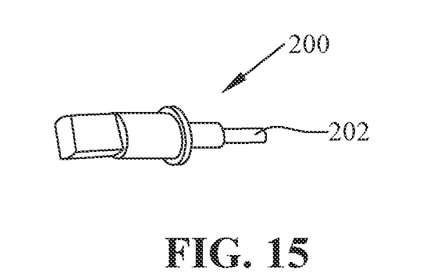
FIG. 15 is one embodiment for a humidity and temperature probe for a heat index and sensing system in accordance with the subject invention.

Now referring to FIG. 15, one embodiment of a temperature/humidity probe is shown general indicated as 200. One suitable temperature and humidity probe that is available by is the Amphenol Telair™ PN T9602-5-D-1. The temperature/humidity probe 200 includes a cable 202 that is provided as part of the temperature/humidity probe assembly going to a PCB connector. The probe connector is lengthened to a minimum of 5 feet (1.6 meter). The standard connector is removed and replaced with Molex Micro Fit™ series of wire to wire circular connectors.

Figure 16:
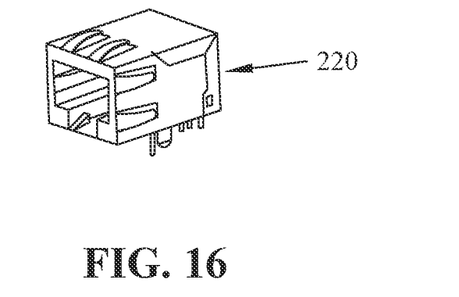
FIG. 16 is one embodiment for a shielded modular a heat index and sensing system in accordance with the subject invention.

Now referring to FIG. 16, one embodiment of a shielded modular jack for use with the invention is shown generally indicated as 220. An RJ11 telephone style RA modular connectors with gold contacts is installed on both the touch screen 24 PCB and CG controller to connect them. This same connector is also used for the cell phone dialing unit and CG controller (i.e. CON12859-1 (Molex™ 432024101) in the NON-shielded version). Suitable connectors include Molex™, Mini Fit Jr™, Micro Fit 3.0™ and RJ telephone type connectors. All are indexed and plug directly onto the PCB for reliability and easy installation.

Regarding the electrical requirements of the system, voltage on the main CGP is a +12 VDC. Voltage to the RSQ is +12 v. There is a redundant filtered power supply to the CGP control unit and touch screen so that if there is a power failure the CGP and touch screen will still operate. Voltage to touch screen is +12 v, filtered, and voltage from touch screen to ambient lights sensor PCB can be +3.3 v. Voltage to temp/humidity probes 200 is +5 v, and Voltage to the Paw Protect is +12 v. Voltage to the pager and other aux sensors is +12 v, and voltage to the cell phone device will be +12 v.

Maximum high-power circuits are 10 A, while the fan smart switch for the CGP and all others are rated at 2 A. The maximum current for the CGP logic circuit on both the controller and touch screen in idle should not exceed 200 mA when power is ON. The maximum current for Rescue sleep mode should not exceed 5 mA when averaged over a 60-minute time period, and the maximum current for CG in sleep mode is 10 mA for both the controller and touch screen. The touch screen LEDs will be off but the touch screen will be active and any time it is touched; it will exit sleep mode. The CG 152 will enter sleep mode if there is no activity after a predetermined time delay.

Since the status of the neutral safety wire changes from vehicle to vehicle, there is a disable input and the selection between +12 v present when vehicle is "in gear" or "in-park". The selection for +12 v "in park" or +12 v "in gear" is customer selectable on the touch screen. On some vehicles, the "in-gear" or "in-park" status is +5 v. This circuit is designed so that whether an input is +5 v or +12 v, the circuit will detect it as Power. This input will disable the alarm trigger in the CGP and the door deploy in the RSQ anytime +12 v is detected. The window drop circuit and the unlock circuit have the capability to provide constant ground to the circuit in the event the window and door unlock circuits are routed through the OEM ECU. Thus, the window drop and unlock outputs will always operate.

Regarding circuit protection, there is one master sealed in-line fuse, supplied, 40 A. There is a poly-fuse on the CG 152 and RSQ 154 to protect the logic part of the circuit. All inputs and outputs are protected against improper installation, including special protection between power (+12 v) input and ground input for reverse polarity installation. Where possible, the feeds to the various sensors and relay packs are protected by smart switches instead of fuses. There is a 10 A fuse for CGP 152 and a 5 A fuse for RSQ 154 in power the distribution box for both +vBatt power. All fuses in the system are of a style with a built in LED indicator for "blown" status on the fuse. The LED is on anytime the fuse is blown or the circuit is shorted.

In operation of the system, the controller communicates with the control head via an RS232 data link. The ignition of vehicle 10 is a critical input. The ignition input is used to initiate the cool down and monitoring sequences, and anytime the ignition input is turned off then, the monitoring sequence will exit. If the ignition is off, the touch screen 24 can be turned on by touching thereof, and the display will turn on. This gives the user the capability to monitor event history, set up information or turn on the fan manually. An exception is the addition of the Paw Protect (PP) 156 unit to the CGP 152. If the ignition is turned off, then CGP 152 will continue monitoring until the PP 156 input is detected. If the PP 156 input signal is detected, then when the PP LED flashes and a chime tone sequence is completed (10 s), an temperature monitoring will exit. If the PP 156 input signal is not detected, then the alarm will trigger; indicating a dog is still inside the cage and needs to be removed.

The touch screen 24 is "on" if battery (+vBatt) power is present, but the backlight may or may not be on. This allows the system to maintain a low quiescent current. The touch screen backlighting will turn on anytime the ignition input is detected and turn off if ignition input is not present. If the ignition input is not present and the touch screen detects a touch, then the touch screen backlight will turn on and the various screens will function. In this condition, however, the temperature is not monitored. If the ignition is present and there is no activity for a period of 180 s (3-minutes), then the touch screen 24 will turn off, but the system will continue to monitor the temperature.

The user, via touch screen 24, has the capability of changing the trigger set points, changing the default from monitoring hot temperatures to cold temperatures, and selecting between Fahrenheit or Celsius as depicted on screen 24e of FIG. 11 and discussed above. The factory default setting is "hot" setting, 90° F. The user can change the default setting between 77° F. and 95° F. and in Celsius the default is +32° C. and range is +24° C. to +35° C. The factory default for the "cold" setting is +35° F. The user can change the default setting between 15° F. and 58° F. and Celsius +2° C., default and range is −12° C. to +12° C. There is a pre-alert trigger that triggers under certain conditions. A trigger occurs when both temperature probes are at 3° F. or C below the trigger set point for a minimum of 15-sec. The pre-alert alarm is maintained for a minimum of 40 s to allow the handler to correct the temperature situation. If after 40 s, of pre-alert warning, and if the temperature is at the trigger set point, then the alarm will trigger. When the pre-alert alarm is initiated, the box around the CG logo turns yellow, the display indicates "hot warning" and the horn and lights will sound in a preset sequence. The handler can turn off the pre-alert warning sequence pressing the "ALARM OFF ONE TIME" button. The T1 42a and T2 42b temperatures are displayed as separate numbers on the touch screen. A temperature warning trigger, will be initiated when the pre-alert 40s timer expires, and the temperature on both probes, read at the temperature set point. The full alarm trigger can be cleared by pressing the reset alarm button 56 on the touch screen, or by pressing the PP switch, or by the temperature dropping below the trigger set point for 60 s. Regarding the heat Index, the temperature/humidity sensor 200 senses both temperature and humidity. Humidity is displayed on the touch screen as a linear graph 40. The heat index is calculated using temperatures 42a and 42b and the humidity. A standard heat index logarithm that is known in the art by meteorologists can be used heretofore. The heat index is displayed on touch screen 24. The calculated heat index derived from the temperature and humidity detected by the temperature sensor is used in a calculation to trigger the set point selected by the user.

Anytime disable input 55 is detected as being activated (+12 v on the input) the alarm horn and lights will not trigger (sound or flash) for any reason including the pre-alert sequence. Touch screen 24 will still display that the temp is above the trigger set point. This input 55 is initiated by the neutral safety switch in the vehicle. It can be either +12 v in gear or in park. There is a set up screen to allow the user to select the status of the input to generate this signal. In the "Disable" condition, if either one or both temp probes fail, then the status will be displayed, but alarm horn and lights will not trigger (sound or flash) for any reason. The disable input will also send a signal to the RSQ A2 input, which will disable the RSQ 154, when the vehicle is "in gear" or "in drive". There is an input on the RSQ harness to the CGP 152 that is a direct +12 v feed to the RSQ 154, which does not require any input from the CGP. In the "Disable" condition, if communication fails between touch screen 24 and the CGP 152, then the CGP will continue to function and monitor the temperature although no status will be displayed, the touch screen shows a 'comm fault' error. If the ignition is detected as off, and the disable input is not detected, and the temperature is above the set point; the pre-alert will sound and 40 s later the alarm will trigger.

Regarding the Alarm Off One Time feature, the user has the capability to select the "ALARM OFF ONE TIME" 56. When selected, the alarm will not trigger for any reason if the vehicle is "in-gear" or "in-park"; the ignition is on. The "ALARM OFF ONE TIME" event is allowed when the user presses the "ALARM OFF ONE TIME" button 56 on operation screen 24. This special manual setting is disabled anytime the ignition is detected as off, or the user presses the "ALARM OFF ONE TIME" button 56 again. If the "ALARM OFF ONE TIME" is active and the ignition is turned off, then the "ALARM OFF ONE TIME" event is cancelled, and the CGP 152 will initiate monitoring immediately. Touch screen 24 displays text indicating the "ALARM OFF ONE TIME" sequence is active and indicates how to deactivate this feature.

Regarding the fan, two types of control, automatic and manual, are accepted. The manual switch 54 is located on the control head touch screen 24 and the fan can be turned on and off manually by pressing the switch. The manual switch for the fan can be operated with the ignition off, if the touch screen is accessed by touching it and the fan is turned on. The touch screen should remain on until the fan is turned off. The automatic fan control is turned on by any triggered alarm event. There is a visual status indicator for "fan on".

Anytime the set point is triggered, the window or windows automatically roll down the total number of seconds that were set on touch screen 24g. The user can program the window drop timer used to roll the windows down on window drop timer sets 116 and 118 on screen 24g. As the system is equipped to operate on a variety of vehicles 10, the user can select between 0-sec and 10-sec. If set at 0-sec., then the window does not drop when the temperature alarm is fully triggered. The handler can still manually roll up or down the windows using the OEM window switches, and the system does not control the up function of the windows.

Regarding the horn and siren, horn and extra siren, they will be triggered anytime an alarm event is triggered. In the pre-alert sequence, the horn double chirps in a preset sequence, which does not repeat. This can be selected as part of the pre-alert sequence. This pre-alert is sounded using the speaker in the touch screen and the siren or chime output. If the alarm triggers, there is a unique horn pattern that is recognizable as a temperature alarm trigger event, such as an SOS signal.

There are two, 2 A smart switch 157a,b, respectively, outputs, for a Light 1 158a and a Light 2 158b (see FIG. 14). For lights in a light bar, most have a wire/input that can be accessed to initiate a light bar flash pattern, this is a continuous signal in the full alarm trigger. It is the same for the parking lights. The user has the capability of selecting the type of light output, continuous or flashing, and in a factory default setting, the lights will turn on and flash in the pre-alert sequence, and not repeat. The same is true with the horn pattern above. In the factory default setting, the alarm trigger pattern is the same as the horn's SOS pattern. The lights are turned off in the full alarm event by pressing the reset alarm switch on touch screen 24, or the PP, or if the temperature returns to a safe condition. This is the same for the horn/siren.

Regarding the pager, the pager output is triggered anytime the temperature set point is triggered. The user can select the pager signal to be continuous, a 2-sec pulse once every 5-min, a pulse every 5 sec as shown in display screen 24h of FIG. 11. The system can also include a cellphone dialer. This output is then connected to a cell phone dialer/camera module. This unit will communicate to the CG module 152 via RS232 protocol.

As discussed above, the system includes a low voltage detection and status displayed 48 on touch screen 24. Anytime low voltage is detected, the CGP 152 continues to operate as long as possible. If the vehicle is "in gear", no alarm is triggered until the vehicle is "in park". Touch screen 24 displays the fault condition and can be used to set an audio tone. There is a factory default for low voltage that is 11 v or 10.5 v. The handler can change the low voltage set point, but no lower than 10.0 v or 10.5, which is the typical voltage that can still operate a relay. If the low voltage set point is triggered and the temperature is below the temperature trigger set point, then a pager signal is initiated. If the low voltage set point is triggered and the temperature is at or above the temp trigger set point, then a full alarm sequence is initiated, which includes the pager and the pre-alarm for hot warning and hot alarm.

As discussed above, the handler can select the brightness level of the touch screen using the light button 58 in the upper right corner of touch screen 24. The factory default setting is full brightness. The user can select a different level of brightness to be his system default. In one embodiment, there will be 5-levels of brightness 100%—full brightness and factory default, 75%, 50%, 25% and full off (se display screen 24f in FIG. 11). If the touch screen is full off, any touch of the screen brings the brightness back to the system default. On the touch screen, there will be an ambient light sensor 34 that automatically dims the lights in a night time situation. To conserve energy and pixel drain on the touch screen, there is a proximity sensor that dims the lights if no object is sensed, and then brings the screen back to full brightness when a hand or other object is detected near thereto.

As noted above, the system tracks the time and date and displays as shown in screen 24a of FIG. 8. The date and time are set at the factory. There is a provision to reset the time and date (including the time zone), but this is also logged as part of the event log history. In default the clock displays military time, but an option is included to change it to a US clock with AM and PM. The time and date are used to log alarm trigger events such as, but not limited to rescue triggers, one time alarm off events, time and date activation and deactivation, equipment tests, and CGP alarm triggers and reason for trigger.

The system also includes the capability to test equipment as discussed above and shown in in display 24b of FIG. 9. When Start Test input 68 is activated all equipment attached is tested that is attached to the Cool Guard, turning each on for 5-sec and then off, in sequence. Pressing the Stop Test switch turns off this test immediately. As each item (horn 70, siren 72m, lights 74, fan 76, pager 78, first and second window drops 80a,b, and first and second temperature probes 82a,b) are being tested, the button will turn yellow during the test and then red or green depending upon pass or fail. Each connected equipment can also be tested individually by pressing the respective buttons. Each button is named with the test function, and the text remains during the test.

When pressing, each separate test button, the item turns on for 3-sec and flash or chirp to indicate the function operates correctly. When the button is pressed, it turns tan to indicate it is in test mode and then turn red or green if the test was successful or failed. Exiting the screen will stop any test that may be in progress.

Regarding diagnostics of the system, the results of the diagnostics are displayed on touch screen 24j as shown in FIG. 11, and if a cell phone is attached to the unit, it sends the diagnostics to the manufacturer for service information. Diagnostics can also be accessed through the S2 Gear screen or by touching the TS if the ignition is off. The diagnostics are displayed for 180 s after there is no activity (presses of any type on the touchscreen) or changes in the variables on the display form testing the inputs. If the ignition is on and diagnostics is accessed, then the CGP 152 continues to cool down or monitor the temperature. An icon is displayed on the diagnostic display. If the ignition is off and no monitoring is occurring, then there is no icon. Each of the inputs must have a +12 v input in order to detect it on the correct pin. Outputs use the EQ test routine and there is a button 68 to access that feature.

Regarding setting up the touch screen, change screen input 60 is selected to access the set up of the various times and sequences for all functions that has a variable in time or action. The user selects a set-up button to access the system set-up feature shown in display screen 24d. The touch screen setup is password protected and includes a default pass. Once the default password is over-written, then it can't be used again. The user has the capability of setting up a personal password, and a method to reset the password without calling the factory, (such as an "I forgot" capability). The system can have a rolling password, such as "one number up" from the current date.

Regarding the change screen input 60, any time the gear button is pressed, the screen turns on. This is the screen the user can access the other screens at any time. Screens accessible from the change screen input include, but are not limited to, Service and System Information, Cool Down, Operation and User, Diagnostics, Event History, Equipment Test, and Touch Screen Calibration. In one embodiment, if the logo screen is accessed from this screen, it remains on until the gear button is touched again, as the 10 s timer is off.

Further elaborating on the temperature/humidity probes, the readings are de-bounced so that the readings are not changed any faster than once every 60 s. The temperature in T1 42a and T2 42b are displayed numerically and de-bounced so that the temperatures only change every 10 sec, for example. If it is calculated that the heat index, puts the actual temperature above 95° F./35° C., then the alarm will trigger no matter what the trigger point is set at. The only exception to the above rule, is if the handler has manually turned the alarm trigger off in the "one time only" event. If the "one time only" alarm trigger off is active, then the alarm will not trigger no matter what the temperature is reading. If the temperature probe T1 or T2 are not detected, then the area around the T1 or T2 text turns red and flashes 10 times and then remains on solid. If this condition persists for 60 s, then the pre-alert is triggered, and if the temperature reached the trigger set point, then the full alarm will trigger. The user is notified if one of temp probes fail. The text on failed probe turns to a red background with light gray text, and the text will be "F" in the box. The chime in the touch screen sounds at each ignition start up and does a rapid chirp for 10-sec, and the red box flicker flashes for 10-sec.

In one embodiment, the system is equipped with Bluetooth (BT), which provides the capability to interface with the user to connect with the user's cell phone to download diagnostic information and event history. The BT can also be used to download new software.

The system also interacts with a CO or smoke sensor, such that any time the CO or smoke sensor is triggered, then a +12 v will be detected and trigger an alarm event.

As discussed above, each trigger event is counted and the cause of the event can be observed in the event history (display screen 24*k*). Event History can also be accessed through the change screen input 60 or by touching the touch screen if the ignition is off. In one embodiment, the Event History is displayed for 180 s after there is no activity (presses of any type on the touchscreen) or changes in the variables on the display form testing the inputs. If the ignition is on and Event History is accessed, then the CGP 152 continues to cool down or monitor the temperature. An icon is displayed on the Event History display. If ignition is off and no monitoring is occurring, then no icon. In one embodiment, features that can be observed in the Event History include CGP events including information of the date, time & source of the trigger event; and trigger event specifics, such as, anytime a hot alarm is triggered due to temperature, anytime an alarm is triggered due to low voltage, anytime an alarm is triggered due to double fault probe, anytime an alarm is triggered due to comm fault to the touch screen lasting more than 60 s, anytime a stall event is detected (if in system), anytime CO reaches a critical level and notifies officer (if in system), and the disable is active and temp on T1 & T2 are above 95 F. The Event History also includes RSQ events, such as, the date and time a fob deploys unlatch event, and the date and time of a door deploy (door open) event plus source of request. The Event History can also include Paw Protect events, such as, the date and time the ignition is turned off and the 60 s timer expires and PP was not activated. One other thing that the Event History includes is monitor of the Alarm Off One Time including the date and time this event is activated, and the date and time 95 F is reached on T1 & T2.

Also, as discussed above, the system includes a speaker 36. Anytime the keyboard is displayed, the speaker clicks with each touch of the keys on the keyboard. When the system is first turned on, for one time only, there is a pleasant tone, low, medium and high like a "do re me" sound, to let user know the audio speaker is functioning. There are no audio tones when the user is pressing the various buttons and switches to move around in the system to change screens. In one embodiment, a click sounds anytime a switch or button is pressed to change a default or selection. On the Event History and the screens associated with it that are saving the dates, as you scroll through the dates and events, there is a rapid clicking sound, and in one embodiment, there is a series of 10-high sounding chirps to indicate the alarm trigger has been turned off for "one time only". When the pre-alert alarm is triggered, there a pattern of chirps is heard for one time only, and when the alarm triggers, then the speaker mimics the horn/chime pattern.

Further elaborating on the Cool Down screen 24*c* of FIG. 10, anytime it is displayed, indicating the system is in the Cool Down mode, then a 10 m climatize timer is initiated. In Cool Down (climatize), the trigger set point is ignored as the car temperature stabilizes. The user can add 5-min to the climate timer by pressing "add 5 m" button 88. This can only be done 2-times. The user can bypass the climate timer by pressing the "bypass" button 86. When this happens, the main user screen appears and all trigger set points are active. There is a countdown clock 90, and it displays how many minutes and seconds are left on the countdown clock, such as 9:32 or 0:25. This timer can be reset to add minutes to the countdown clock. The T1 and T2 actual temperatures are visible as in the T1 & T2 display boxes 84*a*, 84*b*, and the trigger set point 51 is displayed in the center of screen 24*c*. The actual humidity is displayed on the bar graph 40 at top of screen 24*c*. The user can select F or C on the screen at 87 and change as desired. To change the default, the user must access the setup screen. An EQ test button 89 is also available on this screen and the user can go to test while the Cool Down is counting down.

Occasionally, the buttons on the touch screen may become less sensitive and will need to be recalibrated. This is done when the touch screen first powers up, but after time the touch screen resolution may drift or lose orientation. So the calibration touch screen be brought up and reset everything into the new memory.

While the invention has been taught with specific reference to these embodiments, one skilled in the art will recognize that changes can be made in form and detail without departing from the spirit and scope of the invention. Therefore, the described embodiments are to be considered, therefore, in all respects only as illustrative and not restrictive. As such, the scope of the invention is indicated by the following claims rather than by the description.

The invention claimed is:

1. An apparatus for determining a heat index of an interior of a vehicle having a vehicle system, the vehicle system being in one of a plurality of conditions, the apparatus comprising:
   a plurality of sensors positioned to monitor environmental characteristics of the interior of the vehicle;
   a controller operatively coupled to the plurality of sensors, the controller determining the heat index of the interior of the vehicle based on the monitored environmental characteristics of the plurality of sensors;
   an input operatively coupled to the vehicle system; and
   an alarm system operatively coupled to the controller and the input, the alarm system providing an indication in response to the determined heat index satisfying a first characteristic and the vehicle system being in a first condition of the plurality of conditions and the alarm system being disabled when the vehicle system is in a second condition of the plurality of conditions.

2. The apparatus of claim 1, wherein the plurality of sensors includes a temperature sensor positioned inside the vehicle.

3. The apparatus of claim 1, wherein the plurality of sensors includes a humidity sensor positioned inside the vehicle.

4. The apparatus of claim 1, wherein the plurality of sensors includes a carbon monoxide sensor positioned inside the vehicle.

5. The apparatus of claim 1, wherein the plurality of sensors includes a smoke sensor positioned inside the vehicle.

6. The apparatus of claim 1, wherein the environmental characteristics include a temperature inside the vehicle and a humidity inside the vehicle.

7. The apparatus of claim 1, wherein the vehicle system is the transmission system of the vehicle.

8. The apparatus of claim 1, wherein the input monitors a voltage of the vehicle system and based on the voltage the plurality of conditions of the vehicle system may be determined.

9. The apparatus of claim 1, wherein the first condition is the vehicle being in gear and the second condition is the vehicle being in park.

10. The apparatus of claim 1, wherein the first characteristic is a heat index threshold.

11. The apparatus of claim 9, wherein the plurality of sensors includes:
- a temperature sensor positioned inside the vehicle;
- a humidity sensor positioned inside the vehicle;
- a carbon monoxide sensor positioned inside the vehicle; and
- a smoke sensor positioned inside the vehicle.

12. The apparatus of claim 6, wherein the plurality of sensors includes:
- a temperature sensor positioned inside the vehicle;
- a humidity sensor positioned inside the vehicle;
- a carbon monoxide sensor positioned inside the vehicle; and
- a smoke sensor positioned inside the vehicle.

* * * * *